United States Patent [19]

Orszullok

[11] 4,224,962

[45] Sep. 30, 1980

[54] CHANGE VALVE

[75] Inventor: Willy Orszullok, Altena, Fed. Rep. of Germany

[73] Assignee: ITT Industries, Inc., New York, N.Y.

[21] Appl. No.: 934,175

[22] Filed: Aug. 16, 1978

[30] Foreign Application Priority Data

Aug. 31, 1977 [DE] Fed. Rep. of Germany ....... 2739196

[51] Int. Cl.³ ............................................. F16K 11/02
[52] U.S. Cl. .................................. 137/465; 137/119; 137/625.5
[58] Field of Search ..................... 137/119, 467, 625.5, 137/527.5; 251/322, 323

[56] References Cited

U.S. PATENT DOCUMENTS

| 1,937,246 | 11/1933 | Reedy | 137/467 |
| 2,682,386 | 6/1954 | Lindsay | 137/625.5 X |
| 2,942,622 | 6/1960 | Hahn et al. | 137/625.5 |

FOREIGN PATENT DOCUMENTS 2455417  6/1975  Fed. Rep. of Germany ........... 137/467

Primary Examiner—William R. Cline
Attorney, Agent, or Firm—James B. Raden; Donald J. Lenkszus

[57] ABSTRACT

A change valve for sanitary engineering to select either a bath tub or shower head for discharge of water includes a telescoping connection between a valve actuating device and a valve element to achieve reliable operation in the presence of low water pressures.

5 Claims, 1 Drawing Figure

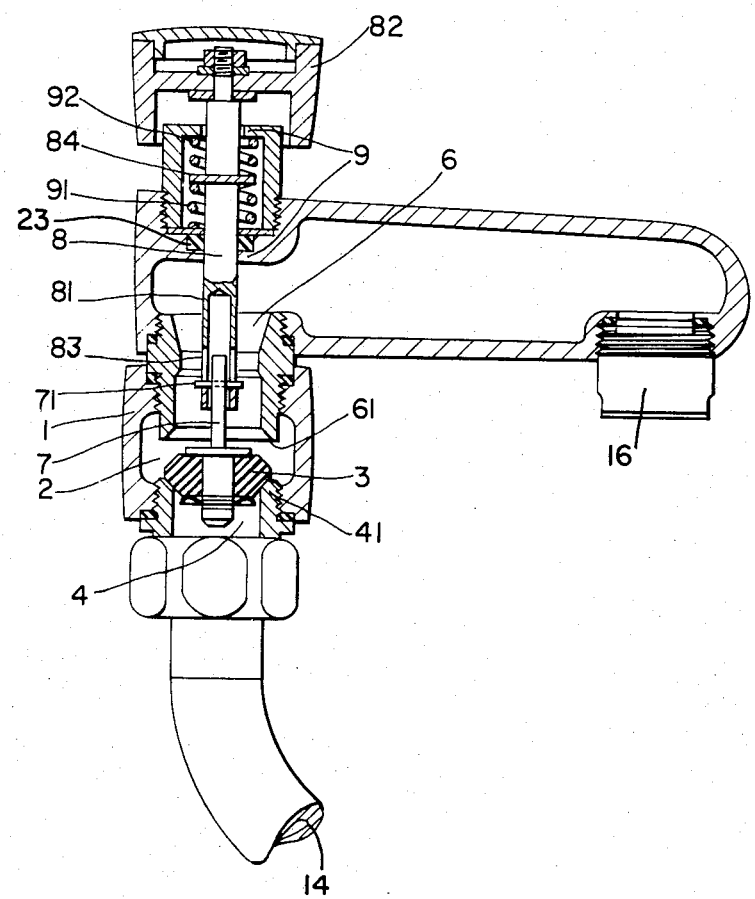

CHANGE VALVE

BACKGROUND OF THE INVENTION

1. Field of the Invention

This invention relates to sanitary engineering valves, in general, and to a change valve for selecting a bath tub faucet or a shower head for water discharge, in particular.

2. Description of the Prior Art

In certain such prior change valves, a valve spindle pushes a double-valve disc backwards and forwards for alternative direction of outflow between valve seats for bath and shower outlets. Automatic return from the shower outlet position to the bath outlet position when the water supply is cut off is typically provided by means of a spring which pushes the valve disc back into the bath outlet position. However, this arrangement requires a relatively powerful return spring to overcome the frictional resistance of a seal on the actuating spindle. Because of the reciprocating action between the valve disc and the actuating spindle, a relatively high operating pressure is required in the change valve to provide proper operation and this, in many cases, is not or is only seldom obtainable from the water supply system. Under low water pressure conditions, the prior change valves cannot be used or can only be used with restrictions.

German Patent Specification No. 901,278 teaches an arrangement whereby the valve disc is arranged separately in the housing to overcome the above shortcomings. Actuation is provided by a low pressure device tappet making non-positive connection with the valve pistons. One disadvantage of this device is that the valve disc can only be moved in one direction to close the bath outlet. The bath outlet can only be opened by blocking the water in-flow by means of the return spring.

SUMMARY OF THE INVENTION

The invention is based upon the need to overcome the shortcomings of known devices described above and to produce a change valve which functions reliably at extremely low operating pressure and in which change-over to any possible outlet position can be made by means of the actuating element.

In accordance with the invention, a valve closing element which can be moved between two valve seats and an actuating device are connected axially movable in such a way that the connected parts can be moved independently of each other through a slightly extended valve stroke. The connection is provided by a hollow end portion of an actuating spindle in which is disposed a guide pin connected to the valve element. A longitudinal slot in the hollow end portion is adapted to receive a coupling pin which is secured to the guide pin. The slot will engage the coupling pin to move the valve element when the actuating element is displaced to either end of its stroke.

DESCRIPTION OF THE DRAWING

The invention may be better understood from a reading of the following description taken in conjunction with the drawing in which the sole FIGURE illustrates in partial cross-section a bath tub faucet including a change valve in accordance with the invention.

DESCRIPTION OF THE PREFERRED EMBODIMENT

The faucet assembly of the FIGURE includes a faucet body 1 having a mixing chamber 2 which is coupled to water supply inlets which are not shown. Arranged coaxially opposite each other on the faucet body 1 are a valve seat 41 for a shower outlet 4 coupled to a shower line 14 and a valve seat 61 for a bath tub outlet 6 coupled to spigot 16. An actuating spindle 8 extends into the valve body where a double-seat valve cone 3 is adjustably held centrally to the two valve seats 41 and 61. A manually operated handle 82 is connected to the exterior end of the actuating spindle 8. The double-seat valve cone 3 is held with limited axial movement in a tubular section 81 of the actuating spindle 8 by means of a central guide pin 7. A longitudinal slot 83 is provided in the tubular section 81. A rigid coupling pin 71 is inserted through the guide pin 7 at right angles to the longitudinal axis and is guided in the longitudinal slot 83 by its projecting ends. The length of the longitudinal slot 83 is dimensioned such that the double-seat valve cone 3 can make contact with the valve seat 41 and the valve seat 61 over the entire stroke length of the valve without displacing the actuating spindle 8.

To enable the actuating spindle 8 to be held reliably in the fitting, it is guided by two axially displaced bearing surfaces 9 and is sealed at the outlet from the water conducting region by means of a seal 23. To limit the axial movement of the actuating spindle, it is fitted with a collar 84 which is located approximately in the middle between the two bearings 9 when the actuating spindle is in a neutral position and has mutually counter-acting helical springs 91 and 92.

The change valve is illustrated in its preferred outlet position with the actuating spindle at its neutral, central or home position. The double-seat valve cone 3 seals the shower outlet valve seat 41 and opens the bath outlet valve seat 61. When the water supply is released, water can only flow out into the bath spigot 16. The shower outlet is blocked. When the actuating spindle 8 is pulled up by its handle 82 against the resistance of the helical spring 92, the coupling pin 71, after overcoming a slight play in the longitudinal slot 83, makes contact and guides the double-seat valve cone to the seat 61, thus closing the bath outlet 6. At the same time, the shower outlet 4 is opened. If the reverse change is to be made from shower outlet to bath outlet during use, the actuating spindle 8 should be pressed down by the handle 82 against the helical spring 91 whereby, after overcoming a slight play, the double-seat valve cone 3 is displaced from valve seat 61 and can be moved into connection with the valve seat 41.

However, if reversal of the outlet direction from the shower outlet to bath outlet is not made manually, gravitational force will produce return of the double-seat valve cone to close the shower outlet when the water supply has been cut off and the hydrostatic pressure effecting the underside of the double-seat valve cone 3 is reduced.

The actuating spindle 8 returns automatically into the neutral, central position by the counter-acting helical springs 91 and 92 after manual actuation.

The double-seat valve cone can also be returned to a preferred outlet position when the water supply has been shut off by a spring instead of gravitational force, for example, for horizontal operation of the change valve. In this case, the spring can be of extremely low tension because only very small forces have to be overcome.

What is claimed is:

1. A change valve for sanitary engineering fittings for selecting a bath tub or a shower head for discharge of outflowing water comprising:
   first and second discharge outlets;
   first and second valve seats adjacent said first and second discharge outlets, respectively;
   a valve closing element movable over a predetermined valve stroke distance between first and second positions whereby when said valve closing element is in said first position said first valve seat is closed and when in said second position said second valve seat is closed;
   an actuating spindle having a hollow tubular section at one end;
   a guide pin connected to said valve closing element and having one end extending within said hollow tubular section;
   a coupling pin secured to said one end of said guide pin at right angles to the longitudinal axis thereof, said hollow tubular section having a longitudinal slot at least equal in length to said valve stroke distance and adapted to engage said coupling pin;
   two bearings axially displaced at the other end portion of said actuating spindle;
   a collar on said other end portion disposed between said bearings;
   a first helical spring positioned between one of said bearings and said collar; and
   a second helical spring positioned between the other of said bearings and said collar, whereby said first and second helical springs return said actuating spindle to a neutral position independently of the position of the valve closing element after actuation.

2. A change valve in accordance with claim 1, wherein automatic return to a preferred one said first or second positions is produced by gravitational forces on the valve closing element when the water supply is cutoff.

3. A diverter valve comprising:
   a casing defining a valve chamber;
   first and second discharge outlets;
   first and second outlet ports communicating with said chamber and respectively communicating with said first and second discharge outlets;
   valve means disposed within said chamber and movable over a predetermined distance between first and second positions for closing and first outlet port in said first position and for closing said second outlet port in said second position;
   actuating means movable from an intermediate position to first and second actuating positions;
   means for automatically returning said actuating means to said intermediate position from said first and second actuating positions;
   means for coupling said valve means and said actuating means, said coupling means comprising a recess, first and second limiting surfaces spaced apart by at least said predetermined distance, and a member extending into said recess, said member carrying an engaging member adapted for engaging said first and second limiting surfaces;
   said valve means comprising one of said extending member or said recess and first and second limiting surfaces and said actuating means comprising the other of said extending member or said recess and first and second limiting surfaces;
   said coupling means being adapted such that when said actuating means is moved to said first or second actuating positions, said valve means is carried respectively to said first or second positions, and to permit independent movement of said actuating means relative to said valve means when said actuating means is in said intermediate position.

4. A diverter valve in accordance with claim 3 wherein:
   one of said first or second positions is a preferred position such that when fluid flow through said chamber is cutoff, gravitational forces on said valve means moves said valve means to said preferred position.

5. A diverter valve in accordance with claims 3 or 4 wherein said return means comprises:
   a first spring means operable on said actuating means when said actuating means is moved said first position for urging said actuating means to said intermediate position; and
   a second spring means operable on said actuating means when said actuating means is moved to said second position for urging said actuating means to said intermediate position.

* * * * *